United States Patent Office 3,207,694
Patented Sept. 21, 1965

3,207,694
COMPOSITIONS FOR AND PROCESSES OF REMOVING STAINS
Charles Jennings Gogek, Belmont, Mass., assignor, by mesne assignments, to Colgate-Palmolive Company, New York, N.Y., a corporation of Delaware
No Drawing. Filed May 26, 1961, Ser. No. 112,795
7 Claims. (Cl. 252—105)

The present invention relates to compositions for and processes of removing stains from a substrate.

There exists a need for compositions and methods which will remove stains of various kinds from the substrate underlying them. In the household, for example, articles of enamelware such as porcelain covered sinks, wash basins, bath tubs and the like frequently become discolored with food stains, drink stains, rust stains and the like which are difficult if not impossible to remove by scouring cleansers consisting essentially of an abrasive powder and a detergent. Scouring cleansers which contain, in addition to abrasive powder and detergent, an ingredient which liberates chlorine when used with water have facilitated the removal of many stains from foods and beverages but they have little if any beneficial effect on the removal of inorganic stains such as rust stains. The present invention provides compositions for and processes of removing stains of organic and inorganic origin from a substrate.

From the composition aspect the invention comprises a reducing agent such as sodium hydrosulfite, an activating agent such as chloranilic acid and an organic buffering agent such as a citrate which, among its beneficial functions, regulates the pH of mixtures of the composition with water within the range where the stain removal power is high but objectionable odor is low or absent. Preferably these agents are admixed with an abrasive agent such as silica flour (silex) and an organic detergent to form a scouring cleanser which not only has good cleaning power for the soil that deposits on and adheres to the surface of the substrate but also removes rust and organic stains.

From the process aspect the invention comprises removing stains from a substrate, e.g., a porcelain surface, by subjecting the substrate to the action of a reducing agent such as sodium hydrosulfite and an activating agent such as chloranilic acid in the presence of an organic buffering agent such as a citrate and water while maintaining the pH under 10 and preferably above 5. Where the substrate is a hard surface such as porcelain the action preferably takes place in conjunction with the scouring action produced by rubbing the surface in the presence of an organic detergent and an abrasive agent such as silica flour.

Sodium hydrosulfite, also properly named sodium dithionite and sodium hyposulfite ($Na_2S_2O_4$), is a known reducing agent which has been proposed as an ingredient in rust removing compositions in the prior art. At low pH, e.g., about 3, it is very effective in rapidly removing iron rust stains on porcelain but in the pH range of effective rust removal its use is accompanied by such a strong odor of sulfur dioxide and hydrogen sulfide that it is not practicable to use it in the household, e.g., as an ingredient in a scouring cleanser. At higher pH values, e.g., above about 5, the development of objectionable odors from sodium hydrosulfite is avoided but its power rapidly to remove iron rust stains is lost or reduced to such a low value as to make it of no practical value as a rust removing ingredient in a scouring cleanser formulated for use at pH 5 and above. Zinc hydrosulfite behaves similarly but is somewhat more stable and exerts its reducing effect and develops odor at a somewhat slower rate than the sodium salt.

The present invention is based on the discovery that the rapid rust removing power which hydrosulfites such as the sodium and zinc salts have at low pH can also be had without objectionable odors at higher pH values up to about 10 in the presence of certain activating agents which come within the class of compounds defined as 2,5-dihydroxy benzoquinones; 2-hydroxy naphthoquinones; substituted 2,5-dihydroxy benzoquinones and 3-substituted-2-hydroxy naphthoquinones in which each substituent is from the group Cl, Br and $NO_2$; the corresponding hydroquinones; salicylic acid and substituted hydroxybenzoic acid in which each substituent is from the group OH and $NH_2$; and suitable salts of these compounds such as the sodium, cupric, ferric and aluminum salts. Representative compounds are named in Table I and equivalent compounds can be determined by the test described hereinafter. For convenience of reference these compounds are given a number which will sometimes be used instead of the name, particularly in Tables II and III.

Table I

No.        Compound
 (1) 2,5-dichloro-3,6-dihydroxy-p-benzoquinone (chloranilic acid)
 (2) Cupric chloranilate
 (3) Ferric chloranilate
 (4) Sodium chloranilate
 (5) Aluminum chloranilate
 (6) 2,5-dihydroxy-p-benzoquinone
 (7) 2,5-dihydroxy-3,6-dibromo-p-benziquinone (bromanilic acid)
 (8) Sodium 2,5-dihydroxy-3,6-dinitro-p-benzoquinone (sodium nitranilate)
 (9) Tetrahydroxy-p-benzoquinone
(10) 2-chloro-3-hydroxy-1,4-naphthoquinone
(11) 2 hydroxy naphthoquinone
(12) Salicylic acid
(13) p-Amino salicylic acid
(14) 5-amino salicylic acid
(15) Gentistic acid
(17) β-Resorcylic acid The chloranilates are the preferred activating agents from the standpoint of rapid removal of rust and organic stains. Chloranilic acid and its sodium salt are red to brown in color and they impart a color to compositions containing them and to aqueous solutions or slurries of these compositions. The cupric salt imparts a green color to compositions containing it and a tan color to aqueous solutions or slurries of these compositions. The ferric salt imparts a medium gray color to compositions containing it and a violet color to aqueous solutions or slurries of these compositions. The colored slurries wash clearly from porcelain surfaces except from rough and badly etched areas of some old sinks where some discoloration occasionally occurs with some of the activating agents such as chloranilic acid and its sodium salt whereas the ferric salt has very low, if any, discoloration potential.

Organic buffering agents which are useful in the compositions and processes of the invention include the following acids, their water-soluble salts and mixtures of the acids and salts in proper proportions to produce the desired effect: acetic acid, the hydroxycarboxylic acids such as citric, tartaric and gluconic acids and the amino carboxylic acids such as amino triacetic acid, its hydroxyethyl derivatives, dihydroxyethyl amino acetic acid and hydroxyethyl amino diacetic acid, ethylene diamine tetracetic acid and its hydroxyethyl derivatives such as hydroxyethyl ethylene diamine triacetic acid and dihydroxyethyl ethylene diamine diacetic acid, and in general the amino carboxylic acids containing more than one carboxylic acid group in alpha position to a nitrogen atom. These buffering agents are also complexing agents. The amino carboxylic acids also chelate or sequester metal ions. Various derivatives of these compounds that retain the buffering and complexing properties of the parent compounds may also be used. Suitable salts include the known alkali and alkaline earth metal salts of these compounds which possess the stated properties.

The organic buffering agent functions not only to regulate and maintain the pH of the composition during use with water within the proper range where stain removal power is high and odor development is low or absent but also to enhance rust removal. Preferably, citric acid or sodium citrate, or a mixture of them, is used as required for pH control. The effect of sodium citrate on the pH and rust removal power of slurries made from compositions containing chloranilic acid (1) at three different levels as shown in Table II. The slurries were made by mixing grams of the composition being tested with 4 ml. of water and subjecting rust stained porcelain panels prepared as described hereinafter to the action of the slurry in accordance with the test procedure set forth hereinafter. In addition to the stated ingredients each composition contained 1% sodium hydrosulfite, 7% of the spray dried detergent and silex.

*Table II*

| Percent (1) | Percent sodium citrate | pH | Percent rust removal | |
|---|---|---|---|---|
| | | | 5 sec. | 15 sec. |
| 0.33 | 0 | 6.6 | ------ | 25 |
| 0.33 | 2 | 7.0 | ------ | 90 |
| 0.33 | 5 | 7.1 | ------ | 85 |
| 0.33 | 10 | 7.1 | ------ | 45 |
| 0.33 | 15 | 7.3 | ------ | 20 |
| 0.67 | 0 | 6.5 | ------ | 40 |
| 0.67 | 2 | 6.7 | ------ | 95 |
| 0.67 | 5 | 7.0 | ------ | 90 |
| 0.67 | 10 | 7.1 | ------ | 75 |
| 0.67 | 15 | 7.2 | ------ | 50 |
| 1.0 | 0 | 6.3 | 10 | 50 |
| 1.0 | 2 | 6.6 | 20 | 90 |
| 1.0 | 4 | 6.7 | 25 | 90 |
| 1.0 | 6 | 6.9 | 25 | 90 |
| 1.0 | 8 | 7.0 | 5 | 90 |

The proportions of the ingredients may be varied over a considerable range. Satisfactory compositions can be prepared which contain for each part by weight of sodium hydrosulfite about 0.01 to 10 parts, preferably about .5 to 2 parts, by weight of chloranilic acid or equivalent and about 0.1 to 20 parts, preferably about 1 to 2 parts, by weight of sodium citrate-citric acid or equivalent. The buffering and complexing agent used preferably should impart to the composition when admixed with water, e.g., in 1% solution of the water-soluble ingredients, a pH within the range of about 5 to 10. Other ingredients may also be present such as surface active agents such as wetting and detersive agents, perfumes, fillers, diluents, abrasives and the like, in widely varying proportions. Where additives are used they should be chosen and proportioned so as not to affect adversely to any substantial degree the properties of the composition comprising the three essential ingredients, i.e., the sodium hydrosulfite, the activator and the buffer.

A preferred product of the invention is a scouring cleanser and in general one having a composition within the following approximate weight percent ranges gives good results:

| Ingredient | Broad range | Preferred range |
|---|---|---|
| Sodium hydrosulfite | 0.5-1 | 2-4 |
| Activating agent | .1-5 | 1-3 |
| Buffering agent | 1-10 | 2-5 |
| Organic detergent | 0-10 | 4-8 |
| Perfume | 0-.5 | .1-.3 |
| Abrasive powder | 65-98 | 80-91 |

A preferred example of a scouring cleanser comprises about:

| | Percent |
|---|---|
| Sodium hydrosulfite | 2.0 |
| Chloranilic acid | 1.0 |
| Citrate | 4.0 |
| Detergent | 6.7 |
| Perfume | 0.3 |
| Silex | 86.0 |

Any suitable detergent may be used including soap and synthetic detergents of the anionic, cationic and non-ionic types. In general, it is preferred to employ a detergent which foams when the cleanser is agitated in the presence of water. A detergent which may be used to good advantage is a water soluble alkali metal salt of an alkyl benzene sulfonic acid having about 8 to 18 carbon atoms in the alkyl group, e.g., the sodium salt of tridecylbenzene sulfonic acid. It is convenient to prepare the detergent for incorporation in the composition by spray drying and this method is the one used in preparing the detergent incorporated in the specific compositions disclosed herein which contains approximately the following ingredients:

| | Percent |
|---|---|
| Sodium salt tridecyl benzene sulfonate | 55 |
| Sodium silicate solids | 5 |
| Sodium sulfate | 38 |
| Moisture, preservative and minor ingredients | 2 |

The preferred abrasive powder used in scouring cleansers is ground quartz or silica (silex). A very satisfactory silex is one which will all pass through a 60 mesh screen, not over 0.5% will remain on a 100 mesh screen, at least about 99% will pass a 200 mesh screen, and about 94% will pass through a 325 mesh screen. Other abrasive powders, however, may be used including finely comminuted feldspar, pumice, chalk, tripoli, kieselguhr, diatomaceous earth, and the like.

A scouring cleanser having the composition of the preferred example given above when used to clean kitchen sinks removes food and beverage stains at least as quickly and easily as scouring cleansers which form the hypochlorite ion on contact with water and in addition iron stains, e.g., those formed by evaporation of iron-containing water dropped on the sink from a leaking faucet, can also be removed by chemical, or a combination of chemical and physical, action.

In order to evaluate the performance of scouring cleansers in a reproducible manner the following test may be used and comparative data given herein are determined by this test. Steel panels coated with medium quality kitchen sink acid resisting porcelain are etched with hydrofluoric under standardized conditions. Part of the panels are then stained with tea by dipping them alternately in standardized tea and ferric sulfate solutions a predetermined number of times and finally lightly rubbing them with a rag saturated with water under a running tap to remove excess iron tannate precipitate which builds up on the surface. The stain is a uniform gray-tan color. The remainder of the panels are stained with iron rust by wetting them, distributing iron powder evenly over the surface and alternately wetting and drying until the surface is a uniformly colored stain. In making the stain removal test two rubber fruit jar rings are stuck together and cemented to the surface of the stained panels with a rubber cement. Usually four sets of the ring are used on the surface of each panel. Four grams of the composition to be tested are slurried or mixed in four milliliters of water for a predetermined period, poured into the well formed by the rings, permitted to stand for a predetermined time, rinsed out with water and the treated area is then visually rated for degree of stain rmoval.

The data in Table III are typical of the results obtained by representative compositions embodying the present invention when used in the above-described test. Each composition contained, in addition to the stated percentages of the ingredients listed in Table III, 7% detergent and the balance silex.

*Table III*

| Composition | Activating agent, percent | | Percent citrate | Percent Na$_2$S$_2$O$_4$ | pH | Rust removal | | Tea stain removal | |
|---|---|---|---|---|---|---|---|---|---|
| | | | | | | Percent | Time, sec. | Percent | Time, sec. |
| I | (1) | 0.1 | 5D | 2 | 6.35 | 75 | 30 | 25 | 15 |
| II | (1) | 0.3 | 5D | 2 | 6.4 | 95 | 30 | 95 | 15 |
| III | (1) | 0.6 | 5D | 2 | 6.4 | 100 | 30 | 100 | 15 |
| IV | (1) | 1.0 | 5D | 2 | 6.5 | 85 | 15 | 100 | 15 |
| V | (6) | 1.5 | 5D | 2 | 6.6 | 70 | 15 | 85 | 15 |
| VI | (7) | 1.0 | 5D | 2 | 6.5 | 60 | 15 | 95 | 15 |
| VII | (8) | 1.2 | 5D | 2 | 6.7 | 50 | 15 | 80 | 15 |
| VIII | (13) | 1.0 | 5D | 2 | 7.0 | 20 | 30 | 50 | 15 |
| IX | (14) | 1.0 | 5D | 2 | 7.0 | 20 | 30 | 50 | 15 |
| X | (10) | .1 | 4A | 2 | 6.9 | 10 | 15 | 10 | 5 |
| XI | (10) | .8 | 4A | 2 | 6.5 | 25 | 15 | 20 | 5 |
| XII | (2) | 1.0 | 4A | 2 | 6.5 | 95 | 30 | — | — |
| XIII | (3) | 1.0 | 4A | 2 | 6.8 | 95 | 30 | — | — |
| XIV | (15) | 1.0 | 5D | 2 | 6.3 | 25 | 30 | — | — |
| XV | (11) | .4 | 4A | 2 | 6.9 | 10 | 15 | — | — |
| XVI | (11) | 1.4 | 4A | 2 | 6.6 | 20 | 15 | — | — |
| XVII | (17) | 1.0 | 5D | 2 | 6.5 | 10 | 30 | 30 | 15 |
| XVIII | (12) | 1.0 | 5D | 2 | 6.8 | 20 | 30 | 50 | 15 |
| XIX | (4) | 1.0 | 4A | 2 | 7.0 | 30 | 15 | 85 | 15 |

D = Sodium citrate dihydrate.
A = Sodium citrate anhydrous.
— = Not determined.

The test data show that chloranilic acid (1) in the range of about .5 to 1% is a somewhat better activating agent under the conditions of these tests than any of the others but that all of them are effective in activating the removal of stains.

The composition may be prepared in any suitable apparatus by admixing the ingredients in any desired order of addition. In making a scouring cleanser in certain types of equipment it may be found advantageous to preblend the activating agent with some powder which will assist in dispersing it uniformly throughout the composition. Thus chloranilic acid can be preblended with calcium carbonate up to about 10% by weight of the final product to facilitate the thorough and uniform dispersion thereof throughout the silex which is then reduced in percentage by the amount of the calcium carbonate employed in the preblend.

It will be understood that the process can be carried out by the use of a premixed composition containing the essential ingredients and any desired other ingredients, the composition being admixed with water at the time the substrate is to be subjected to the action of the product. The premixing of the ingredients, however, is not essential and, if desired, an aqueous solution or slurry can be prepared by adding the ingredients to water one at a time in any sequence or in any combination. Similarly the ingredients can be put on the substrate to be treated or on an applicator such as a wash cloth or brush and then be rubbed on the substrate in the presence of water.

The mechanisms involved in the reactions that occur in the removal of stains during the process of the invention are not fully understood but the net effect, so far as rust removal is concerned, is that the insoluble ferric iron rust is reduced to soluble ferrous iron. Sodium hydrosulfite has unique properties among reducing agents in effecting this reduction but under the conditions imposed by the necessity of avoiding the formation of disagreeable odors in household use sodium hydrosulfite cannot effect this reduction rapidly enough to be of practical value in cleaning sinks and the like in the manner a housewife customarily employs. By supplying, however, the anions of the activator to an aqeous solution containing the hydrosulfite ions and the ions of the organic buffering agent this reduction is rapidly effected. The process of the present invention may therefore be described as the rapid removal of stains from a substrate by subjecting the stained substrate to the action of an aqueous solution containing hydrosulfite ions, ions of an organic buffering agent and anions of an activating agent while the solution is maintained in the pH range of about 5 to 10. Compounds capable of supplying these ions to the aqueous solution have been disclosed hereinabove. In the preferred procedure of carrying out the process the action of the solution is supplemented by rubbing the substrate with a powdered abrasive. The presence of an organic detergent is also beneficial, with or without the abrasive.

The pH of the solution or slurry within the range of 5 to 10 has a significant effect upon the rate of rust removal in the static test described above. For each particular proportion of sodium hydrosulfite and chloranilic acid (or other activating agent) in a formulated composition there is a pH at which the rate of rust removal is a maximum. This can be determined by a routine check of the percent rust removed by the composition at various times, e.g., 5, 15 and 60 seconds, of exposure of the rust stained panel to the action of solutions or slurries thereof at different pH levels. For example, a scouring cleanser comprising, in addition to silex and calcium carbonate used as blending agent or extender for the chloranilic acid, about 1% chloranilic acid, 2% sodium hydrosulfite, 7% detergent and 4% buffering and complexing agent adjusted to give a pH of a 1% slurry of about 6.5, removes the stain 100% in 60 seconds, 95% in 15 seconds and 80% in 5 seconds. When the pH is increased by addition of sodium carbonate to pH 7.1, 8.5, 9.2 and 9.5, respectively, the rust removal is affected as follows:

(1) At 60 seconds' exposure, 100%, 80%, 85% and 85%, respectively;

(2) At 15 seconds' exposure, 75%, 30%, 5% and 20%, respectively;

(3) At 5 seconds' exposure, 70%, 5%, 0 and 5%, respectively.

From these data, which are representative of the influence of pH on the performance of compositions of the invention, it is seen that for exposures of about one minute the effect of pH is relatively minor. Thus a satisfactory product can be produced which under the conditions of the static test, will remove stains without developing undesirable odors even without rubbing in about a minute or so throughout the entire pH range of about 5 to 10. On the other hand, if removal within 15 seconds, or even 5 seconds, is desired, the pH should be adjusted to about 6 to obtain best results. The static test is designed to simulate in the laboratory the stain removal obtained in the practical cleaning of sinks, bath tubs and the like which are usually cleaned by rubbing the surface with the cleanser. With old sinks, however, that have rough, badly etched areas stained with rust accumulated over a long time, the rust stains are not removed as quickly or readily as from new porcelain surfaces and test panels but the relative effectiveness of compositions in the static test is a good indication of the relative effectiveness in practical use, even though it may take substantially longer to remove rust stains from rough, adherent areas of old sinks.

It will be understood that variations in and modifications of the ingredients and the proportions thereof can be made without departing from the scope of the invention as described herein and defined in the claims.

Having thus described the invention, what is claimed is:

1. A stain removing composition consisting essentially of a hydrosulfite selected from the group consisting of sodium and zinc hydrosulfite, an organic buffering agent from the class consisting of acetic acid, hydroxycarboxylic acids, dihydroxyethyl amino acetic acid, amino carboxylic acids containing more than one carboxylic acid group in the alpha position to a nitrogen atom, water soluble salts of these acids and mixtures of such salts and acids, and an activating agent from the class consisting of 2,5-dihydroxy benzoquinones; 2-hydroxy naphthoquinones; substituted 2,5-dihydroxy benzoquinones and 3-substituted 2-hydroxy naphthoquinones in which each substitutent is from the group consisting of Cl, Br and $NO_2$; salicyclic acid, its amino derivatives and salts of these compounds, said hydrosulfite being present at 0.5–10% by weight, said activating agent being present at 0.01 to 10 parts by weight of said hydrosulfite and said buffering agent being present at 0.1 to 20 parts by weight of said hydrosulfite and having a pH within the range of about 5 to 10 when said composition is admixed with water.

2. A composition as set forth in claim 1 which contains also an abrasive powder.

3. A composition as set forth in claim 1 in which the activating agent is chloranilic acid and the buffering agent is from the class consisting of citric acid, sodium citrate and a mixture of them, said chloranilic acid being present at 0.1–5% by weight, said buffering agent being present at 1–10% by weight and the sodium hydrosulfite being present at 0.5–10% by weight.

4. A composition as set forth in claim 3 in which for each part by weight of sodium hydrosulfite the chloranilic acid is within the range of 0.01 to 10 parts and the buffering agent is present within the range of 0.1 to 20 parts.

5. A composition as set forth in claim 2 in the form of a scouring cleanser in which the ingredients are present, on a weight basis, within the following ranges

| | |
|---|---|
| Hydrosulfite | About 0.5% to 10%. |
| Organic buffering agent | About 1% to 10%. |
| Activating agent | About 0.1% to 5%. |
| Abrasive powder | About 65% to 98%. |

6. A scouring cleanser consisting essentially of about 2% to 4% by weight sodium hydrosulfite, about 2% to 5% by weight sodium citrate, about 1% to 3% by weight chloranilic acid, and 78 to 91% by weight silex.

7. The process of removing stains from a substrate which comprises subjecting the substrate to the action of an aqueous solution while it contains hydrosulfite ions, ions of an organic buffering agent from the class consisting of acetic acid, hydroxycarboxylic acids, dihydroxyethyl amino acetic acid, amino carboxylic acids containing more than one carboxylic acid group in the alpha position to a nitrogen atom, water soluble salts of these acids and mixtures of such salts and acids and anions of an activating agent from the class consisting of 2,5-dihydroxy benzoquinones; 2-hydroxy naphthoquinones; substituted 2,5-hydroxy benzoquinones and 3-substituted 2-hydroxy naphthoquinones in which each substituent is from the group consisting of Cl, Br and $NO_2$; salicylic acid its amino derivatives and salts of these compounds, said hydrosulfite being present at 0.5–10% by weight, said activating agent being present at 0.01 to 10 parts by weight of said hydrosulfite and said buffering agent being present at 0.1 to 20 parts by weight of said hydrosulfite to provide, when said composition is admixed with water, a solution being maintained in the pH range of about 5 to 10.

References Cited by the Examiner

UNITED STATES PATENTS

| | | | |
|---|---|---|---|
| 1,151,416 | 8/15 | Stevenot | 252—188 XR |
| 2,165,532 | 7/39 | Binns | 8—110 |
| 2,257,186 | 9/41 | Orthner et al. | 252—105 |
| 2,472,684 | 6/49 | Rossi | 252—105 |
| 2,488,832 | 11/49 | Rossi | 252—105 |
| 2,707,145 | 4/55 | Sparrow et al. | 252—188 XR |
| 2,892,795 | 6/59 | Dalton | 252—121 XR |
| 2,914,374 | 11/59 | Harris et al. | 252—188 XR |

JULIUS GREENWALD, *Primary Examiner.*